(12) United States Patent
Fujita et al.

(10) Patent No.: US 12,017,682 B2
(45) Date of Patent: Jun. 25, 2024

(54) VEHICLE CONTROL SYSTEM

(71) Applicant: Toyota Jidosha Kabushiki Kaisha, Toyota (JP)

(72) Inventors: Kazuyuki Fujita, Gotemba (JP); Yoshinori Watanabe, Isehara (JP); Takayuki Goto, Yokohama (JP); Masahiro Harada, Hadano (JP); Nobuhide Kamata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 17/069,106

(22) Filed: Oct. 13, 2020

(65) Prior Publication Data

US 2021/0107516 A1 Apr. 15, 2021

(30) Foreign Application Priority Data

Oct. 15, 2019 (JP) ................................. 2019-188907

(51) Int. Cl.
*B60W 60/00* (2020.01)
*B60W 30/14* (2006.01)
*G01C 21/34* (2006.01)

(52) U.S. Cl.
CPC ...... *B60W 60/0011* (2020.02); *B60W 30/146* (2013.01); *B60W 60/0015* (2020.02); *G01C 21/3461* (2013.01)

(58) Field of Classification Search
CPC .................... B60W 60/0015; B60W 60/0011
See application file for complete search history.

(56) References Cited

U.S. PATENT DOCUMENTS

| 8,255,110 | B2 | 8/2012 | Taguchi |
| 8,364,394 | B2 | 1/2013 | Taguchi |
| 8,428,812 | B2 | 4/2013 | Taguchi |
| 8,660,778 | B2 | 2/2014 | Taguchi |
| 9,067,571 | B2 | 6/2015 | Matsunaga |
| 9,096,266 | B2 | 8/2015 | Irie |
| 9,352,779 | B2 | 5/2016 | Kindo et al. |
| 9,886,852 | B2 | 2/2018 | Urano |

(Continued)

FOREIGN PATENT DOCUMENTS

| JP | 2007-230454 A | 9/2007 |
| JP | 2009-157502 A | 7/2009 |

(Continued)

*Primary Examiner* — Khoi H Tran
*Assistant Examiner* — Tristan J Greiner
(74) *Attorney, Agent, or Firm* — Dinsmore & Shohl LLP

(57) ABSTRACT

A vehicle control system generates at least one primary candidate of a target trajectory for an automated driving of a vehicle and executes a primary evaluation. An evaluation index of the primary evaluation includes a travel safety level of a travel to follow the primary candidate. The primary candidate having highest travel safety level is selected as at least one strong candidate of the target trajectory. If only one is selected as the strong candidate, the vehicle control system determines the selected strong candidate as a finalist candidate of the target trajectory. If two or more strong candidates are selected, the vehicle control system executes a secondary evaluation for the strong candidates to determine the finalist candidate. An additional evaluation index is used in the secondary evaluation.

3 Claims, 19 Drawing Sheets

(56) References Cited

U.S. PATENT DOCUMENTS

| | | |
|---|---|---|
| 10,048,699 B2 | 8/2018 | Inoue et al. |
| 10,198,944 B2 | 2/2019 | Urano |
| 10,663,973 B2 | 5/2020 | Hashimoto et al. |
| 10,754,347 B2 | 8/2020 | Kamata |
| 11,275,382 B2 | 3/2022 | Hashimoto et al. |
| 2009/0024357 A1 | 1/2009 | Aso et al. |
| 2009/0162825 A1 | 6/2009 | Sakai et al. |
| 2017/0123434 A1* | 5/2017 | Urano ............... B60W 60/0059 |
| 2018/0292834 A1 | 10/2018 | Kindo |
| 2019/0039626 A1 | 2/2019 | Hatano |
| 2019/0212744 A1* | 7/2019 | Milstein ................ B60W 40/02 |
| 2019/0291728 A1* | 9/2019 | Shalev-Shwartz ........................... B60W 50/087 |
| 2020/0010077 A1* | 1/2020 | Cormack .............. B60W 40/08 |
| 2020/0148201 A1* | 5/2020 | King .................... G05D 1/0221 |
| 2020/0174481 A1* | 6/2020 | Van Heukelom ...... G06N 3/045 |
| 2020/0189573 A1* | 6/2020 | King ...................... G06V 20/58 |
| 2021/0001881 A1* | 1/2021 | Poledna ............ B60W 60/0013 |
| 2021/0046924 A1* | 2/2021 | Caldwell ........... B60W 60/0027 |
| 2021/0053561 A1* | 2/2021 | Beller ............. B60W 30/18154 |

FOREIGN PATENT DOCUMENTS

| | | |
|---|---|---|
| JP | 2018-176879 A | 11/2018 |
| WO | 2017/141396 A1 | 8/2017 |

* cited by examiner

VEHICLE CONTROL SYSTEM

CROSS-REFERENCE TO RELATED APPLICATION

The present application claims priority under 35 U.S.C. § 119 to Japanese Patent Application No. 2019-188907, filed Oct. 15, 2019. The contents of this application are incorporated herein by reference in their entirety.

BACKGROUND

Technical Field

The present disclosure relates to a vehicle control system.

Background Art

WO2017/141396A discloses a device in which automated driving control is performed. The automated driving control is control for making a vehicle to travel such that the vehicle follows a target trajectory for the automated driving. The target trajectory is set in accordance with, for example, a plurality of events (e.g., an acceleration event, a deceleration event and a lane change event) which are sequentially executed on a route connecting a starting point and a destination. The set target trajectory is appropriately modified based on driving environment information of the vehicle.

SUMMARY

Consider in detail the case where the target trajectory is modified based on the driving environment information. A minor modification to the target trajectory is unlikely to interfere with the performance of the automated driving control. On the other hand, if the target trajectory is modified to a large extent, it may be difficult to continue the implementation. Especially in the automated driving, securing driving safety is the most important. Therefore, it can be said that the drastic modification should be assumed in light of securing the driving safety.

If two target trajectories are set, it may be possible to slightly modify one of those. Therefore, if two target trajectory are set and an appropriate one is selected from aspect of driving safety, the above problem can be avoided. However, if both of these target trajectories are appropriate, it needs to be determined which target trajectory the vehicle should follow. As mentioned above, it is desirable to develop a technique assuming that two or more target trajectories are appropriate at the same time.

It is an object of the present disclosure to provide a technique capable of avoiding a situation in which it is difficult to continue the vehicle travel so as to follow one appropriate trajectory, since two or more trajectories to be selected are appropriate at the same time in light of the securing driving safety.

A first aspect of the present disclosure is a vehicle control system which performs an automated driving of a vehicle and has the following features.

The vehicle control system comprises a control device.

The control device includes a processor and a memory device.

The memory device stores a program executable by the processor.

When the program is executed by the processor, the processor is configured to:

generate at least one primary candidate of a target trajectory for the automated driving;

execute primary evaluation in which travel safety level of a travel Subsequent to the at least one primary candidate is used as an evaluation index, and select, as a strong candidate, the at least one primary candidate having highest travel safety level from the at least one primary candidate;

if only one is selected as the at least one strong candidate, determine the selected strong candidate as a finalist candidate of the target trajectory; and if two or more are selected as the at least one strong candidate, execute a secondary evaluation for the selected strong candidates based on additional evaluation index to determine the finalist candidate.

A second aspect of the present disclosure further has the following features in the first aspect.

When the program is executed by the processor, the processor is further configured to:

if two or more are selected as the at least one strong candidate, prior to execute the secondary evaluation, judge whether or not the travel safety levels of the selected strong candidates are larger than a threshold.

The processor is further configured to:

if it is determined that the travel safety levels of the selected strong candidates are larger than the threshold, set, as the additional evaluation index, at least one of driving efficiency, a deviation level from a limiting speed, and a degree of change from current vehicle state; and if it is determined that the travel safety levels of the selected strong candidate is less than or equal to the threshold, set a vehicle safety level at an impact as the additional evaluation index.

A third aspect of the present disclosure further has the following features in the first aspect.

When the program is executed by the processor, the processor is further configured to:

judge whether or not the travel safety level of the finalist candidate is higher than the threshold; and if it is determined that the travel safety level of the finalist candidate is less than or equal to the threshold, modify the finalist candidate such that the travel safety level of the finalist candidate larger than the threshold.

A fourth aspect of the present disclosure further has the following features in the first aspect.

The control device includes a first and a second control device capable of communicating with each other.

The first control device includes a first processor and a first memory device.

The first memory device stores a first program executable by the first processor.

The second control device includes a second processor and a second memory device.

The second memory device stores a second program executable by the second processor.

When the first program is executed by the first processor, the first processor is configure to:

generate the at least one primary candidate; and transmit the at least one primary candidate to the second control device.

When the second program is executed by the second processor, the second processor is configured to:

execute the primary evaluation based on the at least one primary candidate received by the second control device and select the at least one strong candidate;

if only one is selected as the at least one strong candidate, determine the selected strong candidate as a finalist candidate of the target trajectory; and if two or more are selected as the at least one strong candidate, execute the secondary evaluation for the selected strong candidates based on the additional evaluation index to determine the finalist candidate.

A fifth aspect of the present disclosure further has the following features in the fourth aspect.

When the second program is executed by the second processor, the second processor is further configured to:

if two or more are selected as the at least one strong candidate, prior to execute the secondary evaluation, judge whether or not the travel safety levels of the selected strong candidates are larger than a threshold.

The second processor is further configured to:

if it is determined that the travel safety levels of the selected strong candidates are larger than the threshold, set, as the additional evaluation index, at least one of driving efficiency, a deviation level from a limiting speed, and a degree of change from current vehicle state; and if it is determined that the travel safety levels of the selected strong candidate is less than or equal to the threshold, set a vehicle safety level at an impact as the additional evaluation index.

A sixth aspect of the present disclosure further has the following features in the fourth aspect.

When the second program is executed by the second processor, the second processor is further configured to:

judge whether or not the travel safety level of the finalist candidate is higher than the threshold; and if it is determined that the travel safety level of the finalist candidate is less than or equal to the threshold, modify the finalist candidate such that the travel safety level of the finalist candidate larger than the threshold.

According to the first aspect, the primary evaluation is executed in which at least one primary candidate having the highest travel safety level is selected as the strong candidate. Then, the secondary evaluation is executed if two or more strong candidates are selected as a consequence of the primary evaluation. The secondary evaluation is executed based on the additional evaluation index. Therefore, even if two or more strong candidate are selected, it is possible to select the finalist candidate therefrom. It has been confirmed by the primary evaluation that the finalist candidate has the highest travel safety level. Therefore, even if the finalist candidate is corrected in light of the driving safety, it is highly likely that only a slight correction will be required. As described above, it is possible to avoid the situation in which it is difficult to continue the vehicle travel in which the vehicle follow one trajectory.

According to the second aspect, if it is determined that the selected travel safety levels are larger than the threshold, at least one of the driving efficiency, the deviation level from the limiting speed, and the degree of change from the current vehicle state is set as the additional evaluation index. On the other hand, if it is determined that the selected travel safety levels are equal to or less than the threshold, the vehicle safety level at the impact is set as the additional evaluation index. In the former case, it is expected that every travel safety to follow any of the strong candidates is ensured. Therefore, in the former case, it is possible to select an appropriate finalist candidate from a viewpoint that is completely different from the travel safety level. On the other hand, in the latter case, it is expected that the travel safety is not secured. Therefore, in the latter instance, it is possible to select the appropriate finalist candidate from the viewpoint of the vehicle safety level assuming a collision that may occur in the near future.

According to the third aspect, if it is determined that travel safety level of the travel to follow the finalist candidate is equal to or less than the threshold, the finalist candidate is corrected so that the travel safety level of the travel to follow the finalist candidate is higher than the threshold. Therefore, even if the travel safety level of the travel to follow the finalist candidate that is selected through the primary or secondary evaluation is low, it is possible to ensure the travel safety based on the corrected finalist candidate.

According to the fourth aspect, the same effect as that according to the first aspect can be obtained by the execution of the first and second programs by the first and second control devices.

According to the fifth aspect, the same effect as that according to the second aspect can be obtained by the execution of the second program by the second control device.

According to the sixth aspect, the same effect as that according to the third aspect can be obtained by the execution of the second program by the second control device.

DESCRIPTION OF THE EMBODIMENTS

An embodiment of the present disclosure will be described below with reference to Figures.

1. Outline

Figure 1:
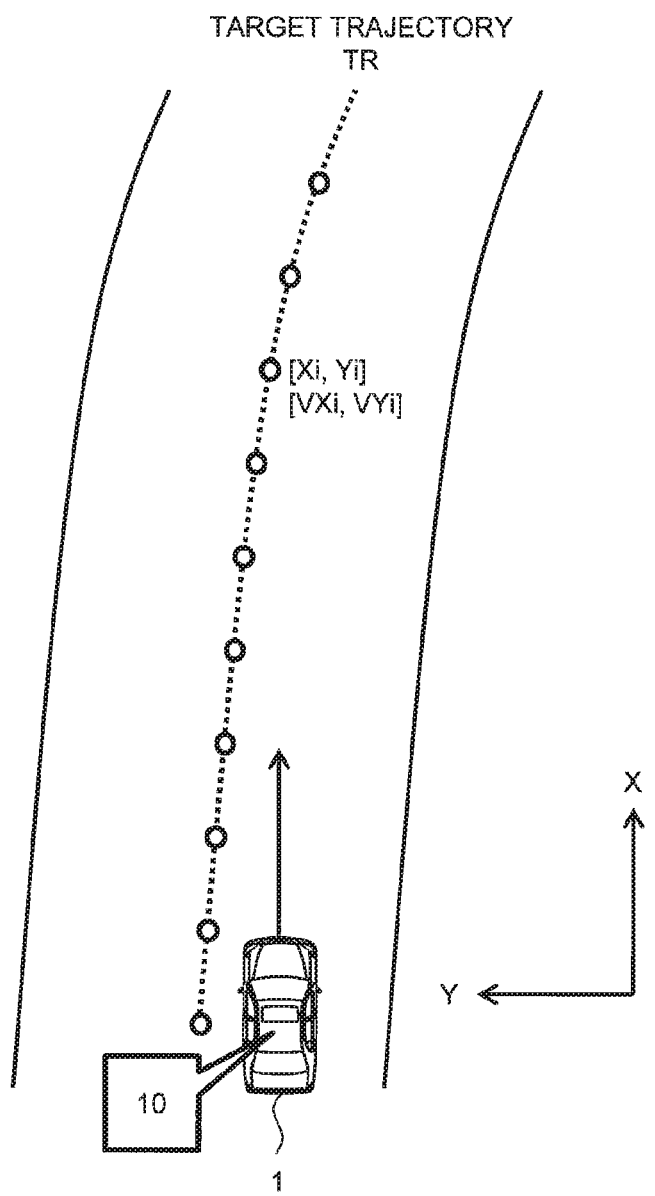
FIG. 1 is a conceptual diagram for explaining an outline of a vehicle control system according to an embodiment of the present disclosure.

FIG. 1 is a conceptual diagram for explaining an outline of a vehicle control system 10 according to the embodiment. The vehicle control system 10 controls a vehicle 1. Typically, the vehicle control system 10 is installed on the vehicle 1. At least a part of the vehicle control system 10 may be placed in an external device outside the vehicle 1 and remotely control the vehicle 1. That is, the vehicle control system 10 may be distributed in the vehicle 1 and the external device.

The vehicle 1 is an automated driving vehicle capable of automated driving. The automated driving here means one where a driver does not necessarily have to 100% concentrate on driving (e.g., so-called Level 3 or more automated driving).

The vehicle control system 10 manages the automated driving of the vehicle 1. Moreover, the vehicle control system 10 executes "vehicle travel control" that controls steering, acceleration, and deceleration of the vehicle 1. In particular, during the automated driving, the vehicle control system 10 executes the vehicle travel control such that the vehicle 1 follows a target trajectory TR.

The target trajectory TR includes at least a set of target positions [Xi, Yi] of the vehicle 1 in a lane on which the vehicle 1 travels. In the example shown in FIG. 1, an X-direction is a forward direction of the vehicle 1, and a Y-direction is a plane direction orthogonal to the X-direction. However, the coordinate system (X, Y) is not limited to the example shown in FIG. 1. The target trajectory TR further include a target velocity [VXi, VYi] for each target position [Xi, Yi]. In order to make the vehicle 1 follow such the target trajectory TR, the vehicle control system 10 calculates a deviation (e.g., a lateral deviation, a yaw angle deviation and a velocity deviation) between the vehicle 1 and the target trajectory TR, and then executes the vehicle travel control such that the deviation decreases.

Figure 2:
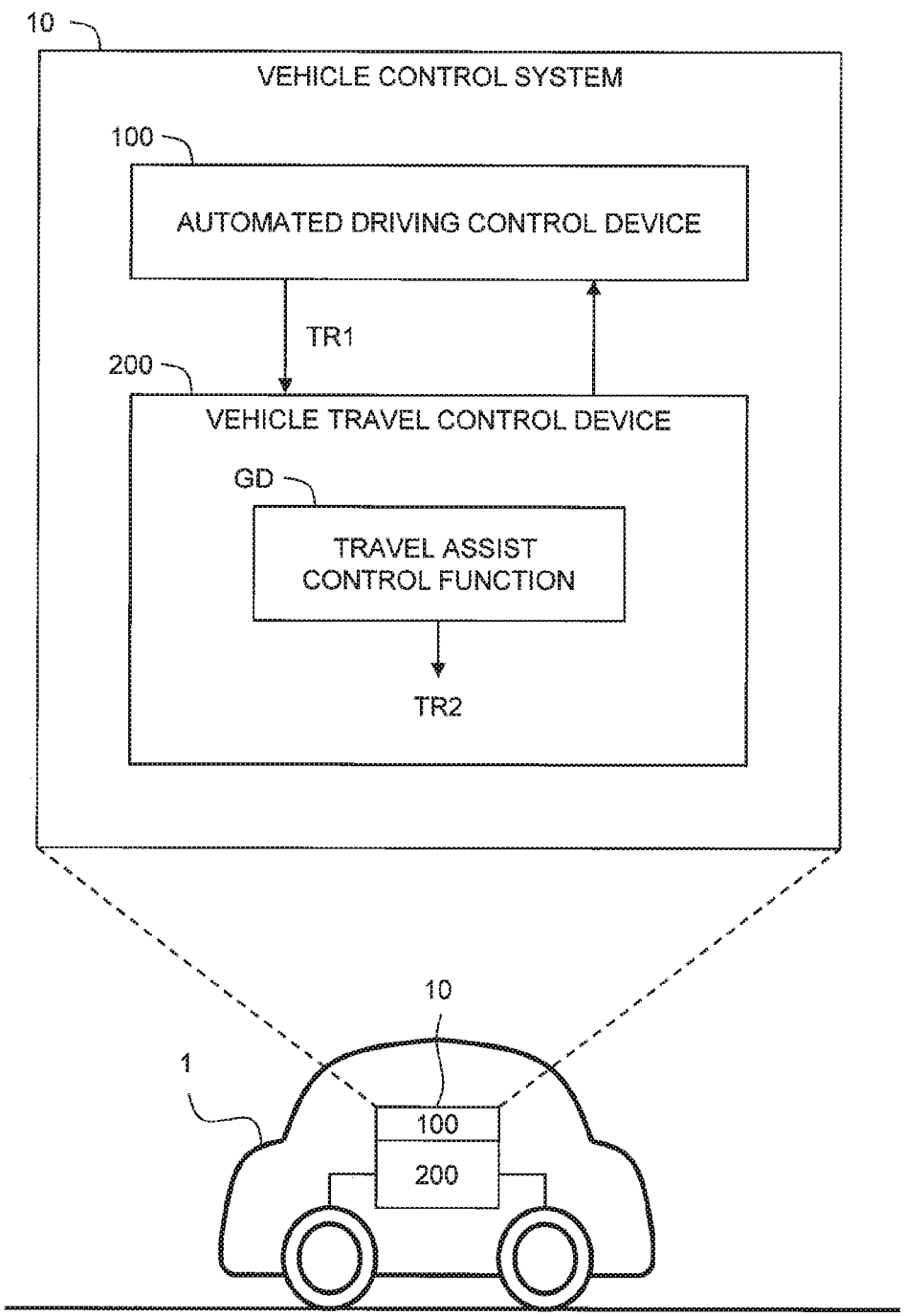
FIG. 2 is a schematic diagram showing a configuration of a vehicle control system according to the embodiment.

FIG. 2 is a block diagram schematically showing a configuration of the vehicle control system 10 according to the embodiment. The vehicle control system 10 includes an automated driving control device 100 and a vehicle travel control device 200. The automated driving control device 100 and the vehicle travel control device 200 may be physically-separated devices, or may be an identical device. When the automated driving control device 100 and the vehicle travel control device 200 are physically-separated devices, they exchange necessary information via communication.

The automated driving control device 100 is responsible for management of the automated driving of the vehicle 1 among the functions of the vehicle control system 10. In particular, the automated driving control device 100 generates the target trajectory TR for the automated driving of the vehicle 1. For example, the automated driving control device 100 uses a sensor to detect (recognize) a situation around the vehicle 1. Then, the automated driving control device 100 generates a travel plan of the vehicle 1 during the automated driving based on a destination and the situation around the vehicle 1. The travel plan includes maintaining a current travel lane, making a lane change, avoiding an obstacle, and so forth. The automated driving control device 100 then generates the target trajectory TR for the vehicle 1 to travel in accordance with the travel plan.

The target trajectory TR for the automated driving generated by the automated driving control device 100 is hereinafter referred to as a "first target trajectory TR1". The automated driving control device 100 outputs the generated first target trajectory TR1 to the vehicle travel control device 200.

On the other hand, the vehicle travel control device 200 is responsible for the vehicle travel control among the functions of the vehicle control system 10. That is, the vehicle travel control device 200 controls the steering, the acceleration, and the deceleration of the vehicle 1. In particular, the vehicle travel control device 200 controls the steering, the acceleration, and the deceleration of the vehicle 1 such that the vehicle 1 follows the target trajectory TR. In order to make the vehicle 1 follow the target trajectory TR, the vehicle travel control device 200 calculates a deviation (e.g., a lateral deviation, a yaw angle deviation and a velocity deviation) between the vehicle 1 and the target trajectory TR, and then executes the vehicle travel control such that the deviation decreases.

During the automated driving of the vehicle 1, the vehicle travel control device 200 receives the first target trajectory TR1 from the automated driving control device 100. Basically, the vehicle travel control device 200 executes the vehicle travel control such that the vehicle 1 follows the first target trajectory TR1.

The vehicle travel control device 200 according to the embodiment further has a function of "travel assist control" (travel assist control function GD) that assists travel of the vehicle 1. In the travel assist control, at least one of steering, acceleration, and deceleration of vehicle 1 is controlled in order to improve the driving safety of the vehicle 1. The travel assist control includes collision avoidance control and lane departure suppression control. The collision avoidance control assists avoidance of a collision between the vehicle 1 and a surrounding object (namely, an avoidance target). The lane departure suppression control suppresses the vehicle 1 from departing from a travel lane.

The vehicle travel control device 200 uses sensors to detect a situation around the vehicle 1 and a state of the vehicle 1. Then, the vehicle travel control device 200 judges whether or not the travel assist control needs to be executed based on detected result of the sensors. More specifically, the vehicle travel control device 200 judges whether or not a travel safety level TSL of a travel to follow the first target trajectory TR1 is higher than a threshold TH. The travel safety level TSL is calculated, for example, by a risk to collide with the avoidance target. If the travel safety level TSL is judged to be less than or equal to the threshold TH, the vehicle travel control device 200 generates the target trajectory TR for the travel assist control.

The target trajectory TR for the travel assist control is the target trajectory TR in which the travel safety level TSL of the travel to follow the target trajectory TR is higher than the threshold TH. The target trajectory TR of which the travel safety level TSL is higher than the threshold TH is hereinafter referred to as a "second target trajectory TR2". The second target trajectory TR2 is generated by modifying the first target trajectory TR1.

If the second target trajectory TR2 is generated, the vehicle travel control device 200 determines the second target trajectory TR2 as a final target trajectory TR. That is, when the second target trajectory TR2 is generated, the vehicle travel control device 200 adopts it as the final target trajectory TR. The vehicle travel control device 200 then executes the travel assist control such that the vehicle 1 follows the second target trajectory TR2.

Figure 3:
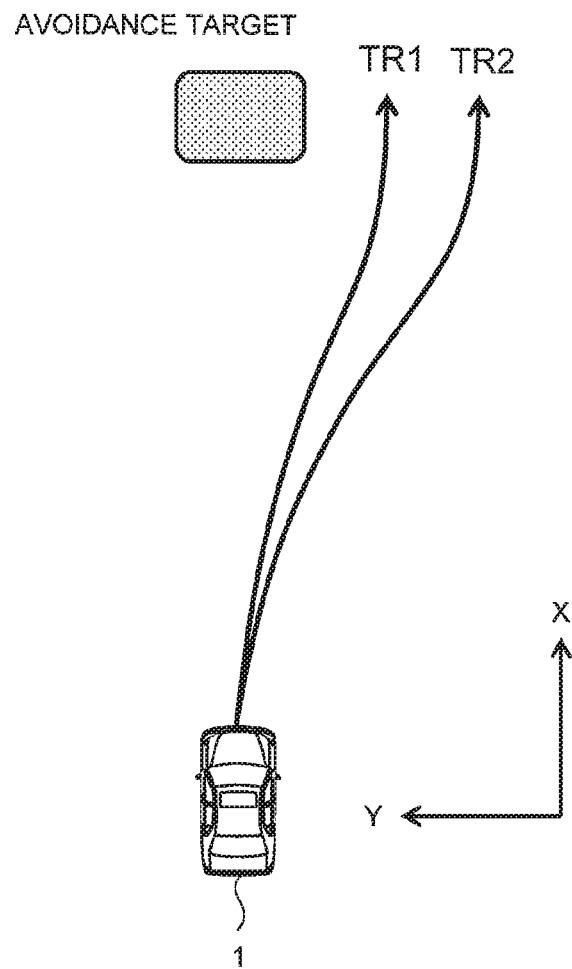
FIG. 3 is a conceptual diagram illustrating an example of travel assist control according to the embodiment.

As an example, FIG. 3 shows a situation in which the avoidance target such as a walker or an obstacle is present in front of the vehicle 1. The first target trajectory TR1 may not be appropriate from a viewpoint to avoid a collision. For example, when function or performance of the automated driving control device 100 is limited, the avoidance target is not recognized. Even if the avoidance target is recognized, an accuracy of the recognized position is low.

Therefore, if the vehicle 1 travels to follow the first target trajectory TR1 shown in FIG. 3, a distance DY between the avoidance target and the vehicle 1 when the X position of the former coincides with that of the latter is insufficient. Hence there is a risk to collide with the avoidance target. If it is determined that the travel safety level TSL of the travel following first target trajectory TR1 is equal to or less than the threshold TH, the second target trajectory TR2 is generated. The difference between the second target trajectory TR2 and the first target trajectory TR1 is in the target position [Yi] in the Y-direction when the X positions of the avoidance target and vehicle 1 coincide.

Figure 4:
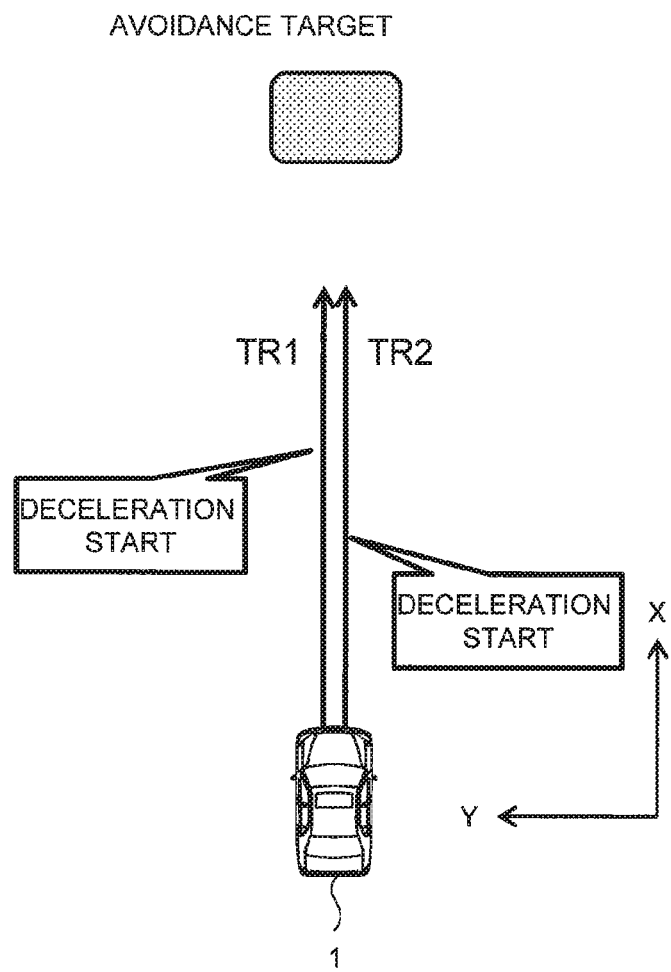
FIG. 4 is a conceptual diagram illustrating another example of the travel assist control according to the embodiment.

FIG. 4 shows another example. The first target trajectory TR1 shown in FIG. 4 is the target trajectory TR for deceleration. However, when the vehicle travels to follow this first target trajectory TR1, a Time to collision TTC is insufficient and there is a risk to collide with the avoidance target. If it is determined that the travel safety level TSL of the travel following first target trajectory TR1 is equal to or less than the threshold TH, the second target trajectory TR2 is generated. The difference between the second target trajectory TR2 and the first target trajectory TR1 is in the target speed [VXi] in the X-direction. The target speed [VXi] of the second target trajectory TR2 is set such that the deceleration starts from earlier timing than that of the first target trajectory TR1. The target speed [VXi] of the second target trajectory TR2 may be set such that rapid deceleration is performed.

Here, since securing of the driving safety in the automated driving is of the utmost importance, the higher the travel safety level TSL for traveling to follow the first target trajectory TR1, the more desirable. It is also desirable that the generation of the second target trajectory TR2 is executed by a modification of the first target trajectory TR1 having a higher travel safety level TSL. This is because, if the travel safety level TSL of the travel to follow the first target trajectory TR1 is low, it is necessary to modify the first target trajectory TR1 to a large extent in order to generate the second target trajectory TR2. And this increases the burden of the processing.

Therefore, in the vehicle travel control system according to the embodiment, the automated driving control device 100 generates at least one primary candidate PC of the target trajectory TR as the first target trajectory TR1. To generate at least one primary candidate PC means including a case where only one primary candidate PC is generated and the case where two or more primary candidate PC are generated. In many cases where the avoidance target is present, more than one primary candidate PC is generated. An example of the case where only one primary candidate PC is generated is a case where the vehicle 1 travels at a constant speed in the current lane having no avoidance target.

Figure 5:
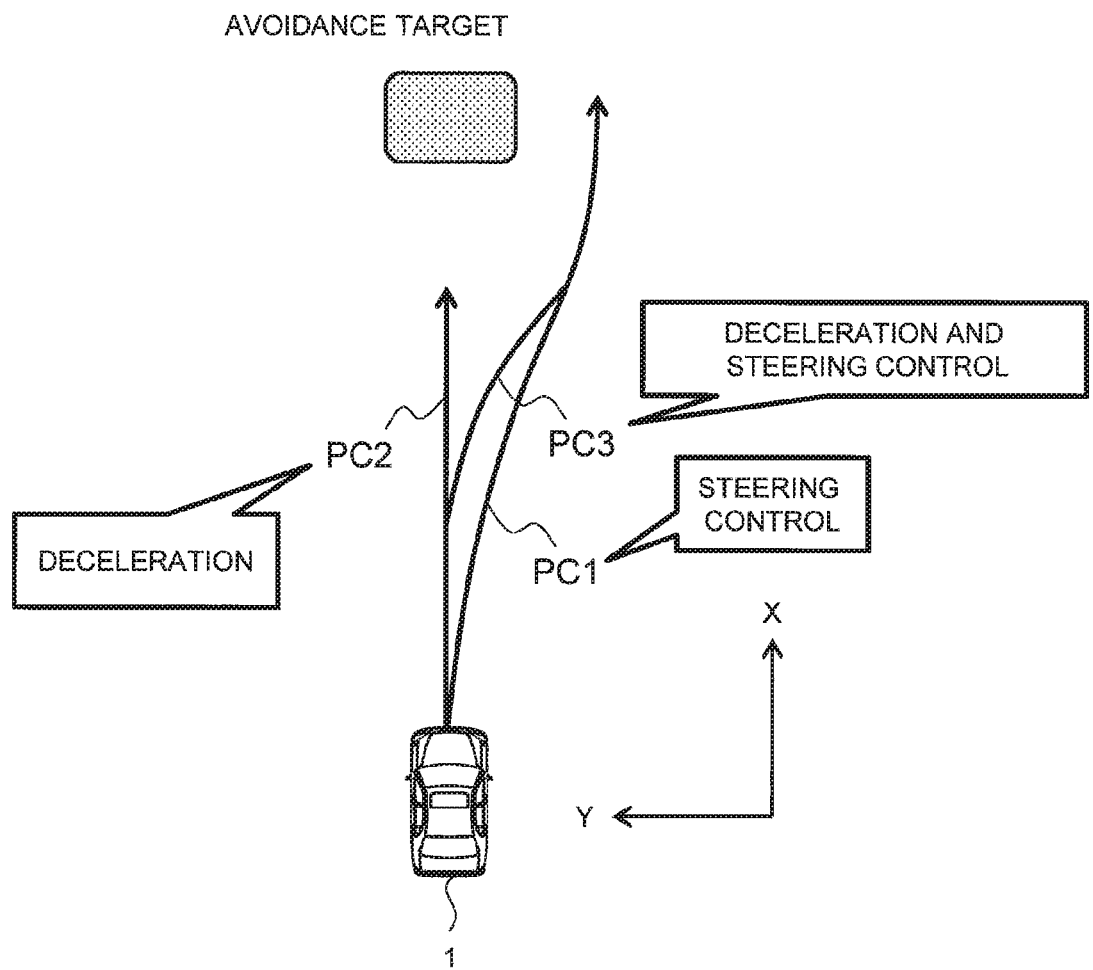
FIG. 5 is a conceptual diagram illustrating an example of a primary candidate.

FIG. 5 is a conceptual diagram illustrating an example of a primary candidate PC. In the example shown in FIG. 5, a PC1, a PC2 and a PC3 are generated as the primary candidate PC to avoid the collision with the avoidance target. The primary candidate PC1 requests the vehicle 1 to steer. The primary candidate PC2 requires the vehicle 1 to slow down. The primary candidate PC3 requires both the steering and the deceleration of the vehicle 1.

In the vehicle traveling control system according to the embodiment, when two or more primary candidates PC are generated, the vehicle travel control device 200 executes the evaluation. In the evaluation, each of the travel safety level TSL of the respective travel to follow the primary candidates PC is used as the evaluation index. The vehicle travel control device 200 also determines a finalist candidate FC of the first target trajectory TR1 based on a result of this evaluation. Specifically, in this evaluation, each of the travel safety level TSL of the respective travel to follow the respective primary candidates PC is compared. The primary candidate PC having the highest travel safety level TSL is determined to the finalist candidate FC.

Figure 6:
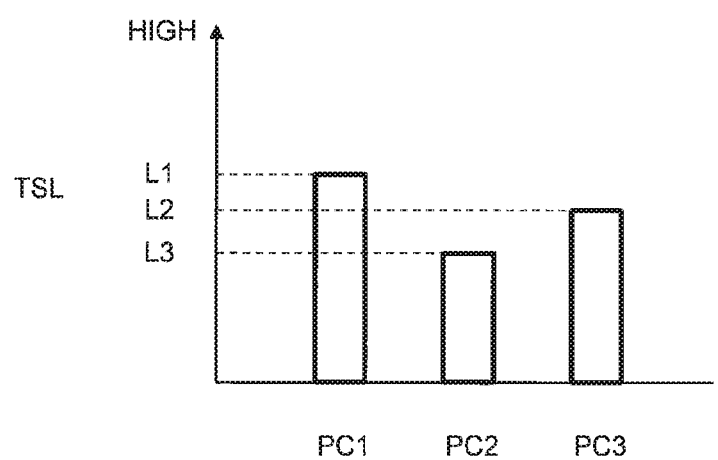
FIG. 6 is a diagram for explaining an example of an evaluation using a travel safety level of a travel to follow the primary candidate.

FIG. 6 is a diagram for explaining an example of the evaluation in which the travel safety level TSL of the travel to follow the primary candidate PC is used. In the example shown in FIG. 6, the travel safety level TSL of the travel to follow the primary candidate PC1 (L1) is higher than that to follow the primary candidate PC2 or PC3 (L2 or L3). Therefore, the primary candidate PC1 is determined to the finalist candidate FC.

Figure 7:
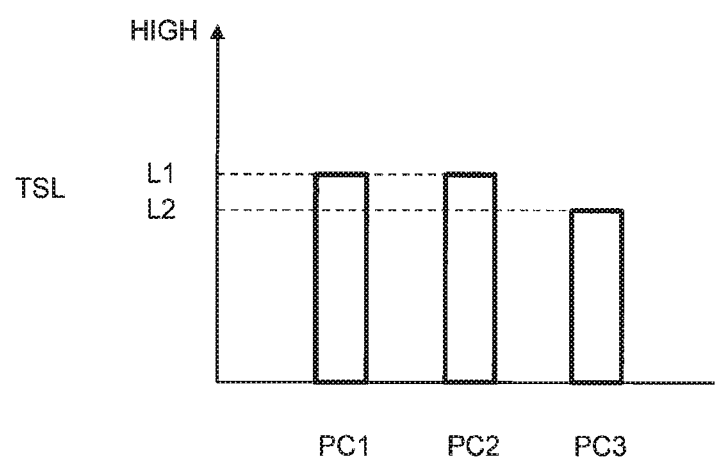
FIG. 7 is a diagram for explaining another example of an evaluation using a travel safety level of a travel to follow the primary candidate.

However, if the two or more primary candidates PC are generated, there is a possibility that more than one primary candidates PC having the highest travel safety level TSL remains. FIG. 7 is a diagram illustrating another example of the evaluation in which the travel safety level TSL of the travel to follow the primary candidates PC. In the example shown in FIG. 7, the travel safety level TSL of the travel to follow the primary candidate PC1 (L1), is equal to that to follow the candidate PC2. Therefore, it is unable to narrow down the finalist candidate FC to one, and it becomes difficult to continue the execution of the vehicle travel control or to execute the execution of the travel assist control.

Therefore, in the vehicle travel control system according to the embodiment, when two or more primary candidates PC having the highest travel safety level TSL remain, an evaluation is executed by using an evaluation index that differs from the travel safety level TSL. Hereinafter, the evaluation index differing from the travel safety level TSL is referred to as an "additional evaluation index". The evaluation based on the travel safety level TSL is called a "primary evaluation" and the evaluation based on the additional evaluation index is called a "secondary evaluation". And the primary candidates PC that is an object of the secondary evaluation is called a "strong candidate SC".

If the secondary evaluation is executed, it is possible to narrow down the finalist candidate FC to one. In addition, primary evaluation has confirmed that this finalist candidate has the highest travel safety level. Therefore, even if the finalist candidate FC is modified to generate the second target trajectory TR2, it is highly possible that a slight modification of the finalist candidate FC will suffice. Therefore, it is possible to avoid the situation in which becomes difficult to continue the execution of the vehicle travel control or to execute the execution of the travel assist control.

The automated driving control device 100 and the vehicle travel control device 200 may be designed and developed separately. For example, the vehicle travel control device 200 responsible for the vehicle travel control is designed and developed by developers (typically a vehicle manufacturer) who are familiar with mechanical and vehicle motion characteristics. In this instance, reliability of the travel assist control function GD of the vehicle travel control device 200 is very high. Given the use of the travel assist control function GD having a high reliability, an automated driving provider is able to design and develop software for the automated driving control device 100. In that sense, the vehicle travel control device 200 can be said to be a platform for automated driving services.

Hereinafter, the vehicle control system 10 according to the embodiment will be described in more detail.

2. Automated Driving Control Device 100

2-1. Configuration Example

Figure 8:
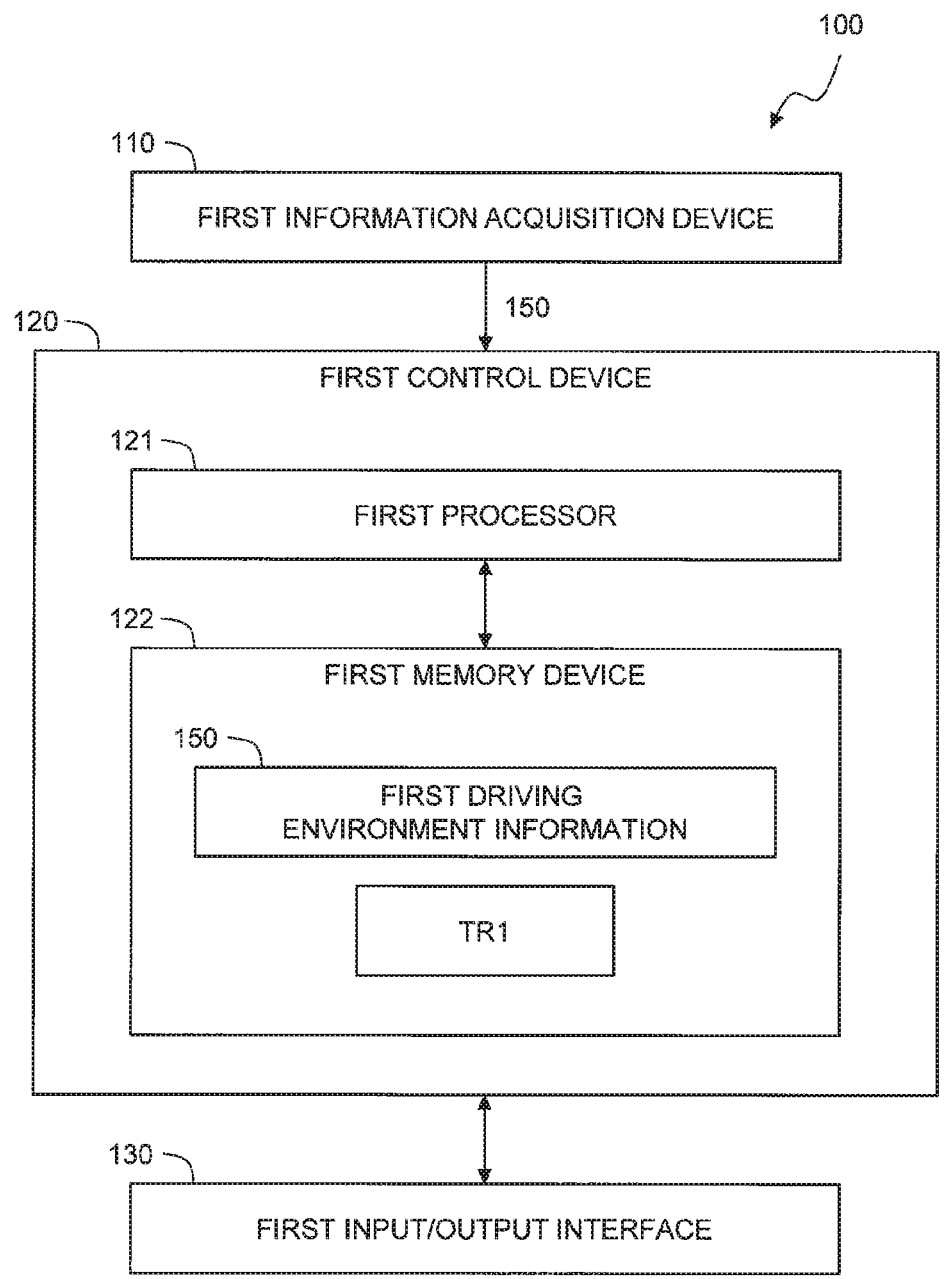
FIG. 8 is a block diagram showing a configuration example of an automated driving control device according to the embodiment.

FIG. 8 is a block diagram showing a configuration example of the automated driving control device 100 according to the embodiment. The automated driving control device 100 is provided with a first information acquisition device 110, a first control device 120, and a first input/output interface 130.

The first information acquisition device 110 acquires first driving environment information 150. The first driving environment information 150 is information indicating a driving environment for the vehicle 1 and necessary for the automated driving of the vehicle 1.

Figure 9:
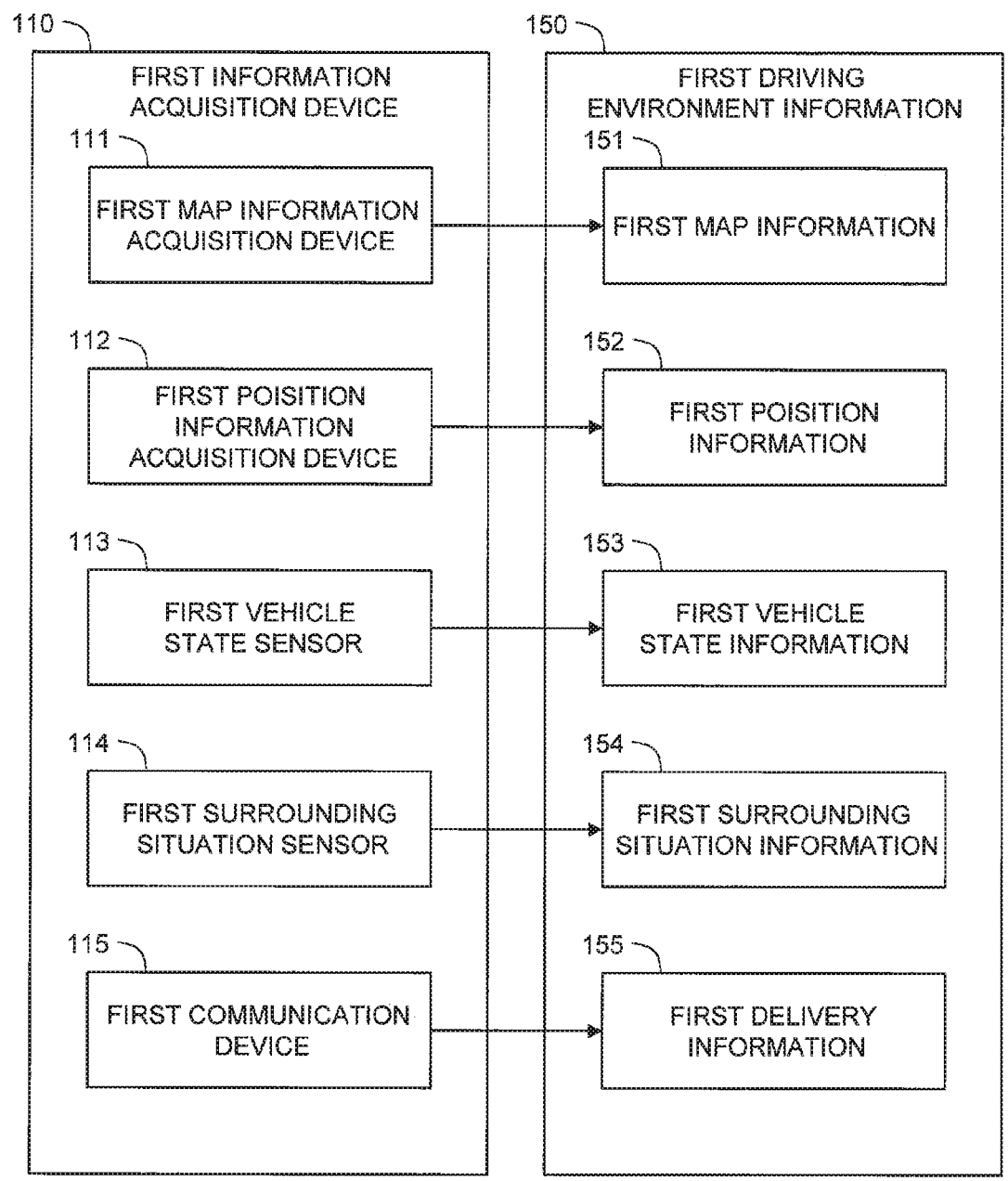
FIG. 9 is a block diagram showing an example of a first information acquisition device and first driving environment information in the automated driving control device according to the embodiment.

FIG. 9 is a block diagram showing an example of the first information acquisition device 110 and the first driving environment information 150. The first information acquisition device 110 includes a first map information acquisition device 111, a first position information acquisition device 112, a first vehicle state sensor 113, a first surrounding situation sensor 114, and a first communication device 115. The first driving environment information 150 includes first map information 151, first position information 152, first vehicle state information 153, first surrounding situation information 154, and first delivery information 155.

The first map information acquisition device 111 acquires the first map information 151. The first map information 151 includes, for example, information on a lane configuration and a road shape. The first map information acquisition device 111 acquires the first map information 151 of a necessary area from a map database. The map database may be stored in a predetermined memory device mounted on the vehicle 1, or may be stored in a management server outside the vehicle 1. In the latter case, the first map information acquisition device 111 communicates with the management server to acquire the necessary first map information 151.

The first position information acquisition device 112 acquires the first position information 152 indicating a position and an orientation of the vehicle 1. For example, the first position information acquisition device 112 includes a GPS (Global Positioning System) device for measuring the position and the orientation of the vehicle 1. The first position information acquisition device 112 may perform well-known localization to increase accuracy of the first position information 152.

The first vehicle state sensor 113 acquires the first vehicle state information 153 indicating a state of the vehicle 1. For example, the first vehicle state sensor 113 includes a vehicle speed sensor, a yaw rate sensor, an acceleration sensor, a steering angle sensor, and the like. The vehicle speed sensor detects a vehicle speed (i.e., a speed of the vehicle 1). The yaw rate sensor detects a yaw rate of the vehicle 1. The acceleration sensor detects an acceleration (e.g., a lateral acceleration, a longitudinal acceleration, a vertical acceleration) of the vehicle 1. The steering angle sensor detects a steering angle (a wheel turning angle) of the vehicle 1.

The first surrounding situation sensor 114 recognizes (detects) a situation around the vehicle 1. For example, the first surrounding situation sensor 114 includes at least one of a camera, a LIDAR (Laser Imaging Detection and Ranging), and a radar. The first surrounding situation information 154 indicates a result of recognition by the first surrounding situation sensor 114. For example, the first surrounding situation information 154 includes target information about a target recognized by the first surrounding situation sensor 114. The target is exemplified by a surrounding vehicle, a pedestrian, a roadside structure, an obstacle, a white line (lane marking), and the like. The target information includes information on a relative position and a relative velocity of the target with respect to the vehicle 1.

The first communication device 115 communicates with the outside of the vehicle 1. For example, the first communication device 115 communicates with an external device outside of the vehicle 1 via a communication network. The first communication device 115 may perform V2I communication (vehicle-to-infrastructure communication) with a surrounding infrastructure. The first communication device 115 may perform V2V communication (vehicle-to-vehicle communication) with a surrounding vehicle. The first delivery information 155 is information acquired through the first communication device 115. For example, the first delivery information 155 includes information on the surrounding vehicle and road traffic information (e.g., road work zone information, accident information, traffic restriction information, and traffic jam information).

It should be noted that a part of the first information acquisition device 110 may be included in the vehicle travel control device 200. That is, the automated driving control device 100 and the vehicle travel control device 200 may share a part of the first information acquisition device 110. In that case, the automated driving control device 100 and the vehicle travel control device 200 exchange necessary information with each other.

Referring again to FIG. 8, the configuration example of the automated driving control device 100 is described. The first input/output interface 130 is communicably connected with the vehicle travel control device 200.

The first control device 120 (i.e., a first control device) is an information processing device for executing a variety of processing. For example, the first control device 120 is a microcomputer. The first control device 120 is also called an ECU (Electronic Control Unit). More specifically, the first control device 120 includes a first processor 121 and a first memory device 122.

A variety of information is stored in the first memory device 122. For example, the first driving environment information 150 acquired by the first information acquisition device 110 is stored in the first memory device 122. The first memory device 122 is exemplified by a volatile memory, a nonvolatile memory, and a HDD (Hard Disk Drive).

The first processor 121 executes automated driving software which is a computer program. The automated driving software is stored in the first memory device 122 or recorded on a computer-readable recording medium. The functions of the first control device 120 are realized by the first processor 121 executing the automated driving software.

The first control device 120 (the first processor 121) executes the management of the automated driving of the vehicle 1. In particular, the first control device 120 generates the first target trajectory TR1. Hereinafter, generating the first target trajectory TR1 will be described in more detail.

2-2. Generation of First Target Trajectory

Figure 10:
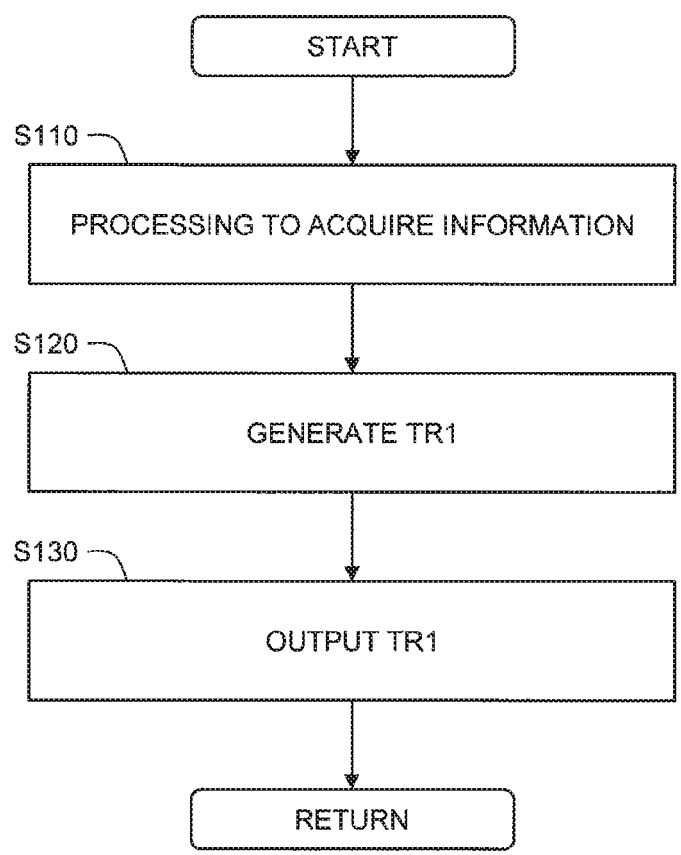
FIG. 10 is a flowchart showing processing executed by the automated driving control device according to the embodiment.

FIG. 10 is a flow chart showing processing by the first control device 120 of the automated driving control device 100 according to the embodiment. During the automated driving of the vehicle 1, the processing flow shown in FIG. 10 is repeatedly executed at a regular interval.

At first, the first control device 120 acquires the first driving environment information 150 from the first information acquisition device 110 (step S110). The first driving environment information 150 is stored in the first memory device 122.

Subsequent to the step S110, the first control device 120 generates the first target trajectory TR1 for the automated driving of the vehicle 1, based on the first driving environment information 150 (step S120). More specifically, the first control device 120 generates a travel plan of the vehicle 1 during the automated driving, based on the first driving environment information 150. Then, the first control device 120 generates the first target trajectory TR1 as a target trajectory for the vehicle 1 to travel in accordance with the travel plan.

For example, the first control device 120 generates the first target trajectory TR1 for traveling while maintaining a current travel lane. More specifically, based on the first map information 151 (the lane configuration) and the first position information 152, the first control device 120 recognizes a travel lane in which the vehicle 1 is traveling and acquires a configuration shape of the travel lane ahead of the vehicle 1. Then, the first control device 120 generates the first target trajectory TR1 for traveling while maintaining the travel lane, based on the acquired configuration shape of the travel lane ahead of the vehicle 1.

As another example, the first control device 120 generates the first target trajectory TR1 for making a lane change. More specifically, based on the first map information 151 (the lane configuration), the first position information 152, and a destination, the first control device 120 plans to make a lane change in order to reach the destination. Then, the first control device 120 generates the first target trajectory TR1 for realizing the lane change based on the lane change plan.

As yet another example, the first control device 120 generates the first target trajectory TR1 for avoiding a collision between the vehicle 1 and a surrounding object. More specifically, based on the first surrounding situation information 154 (the target information), the first control device 120 recognizes an avoidance target ahead of the vehicle 1. Furthermore, based on the first vehicle state information 153 and the first surrounding situation information 154, the first control device 120 predicts respective future positions of the vehicle 1 and the avoidance target and calculates a possibility that the vehicle 1 collides with the avoidance target. If the possibility that the vehicle 1 collides with the avoidance target is equal to or higher than a threshold, the first control device 120 generates the first target trajectory TR1 for avoiding the collision based on the first vehicle state information 153 and the first surrounding situation information 154. Typically, the first target trajectory TR1 for avoiding the collision demands at least one of the steering and the deceleration.

Subsequent to the step S120, the first control device 120 outputs the first target trajectory TR1 to the vehicle travel control device 200 via the first input/output interface 130 (step S130). Every time the first target trajectory TR1 is updated, the latest first target trajectory TR1 is output to the vehicle travel control device 200.

3. Vehicle Travel Control Device 200

3-1. Configuration Example

Figure 11:
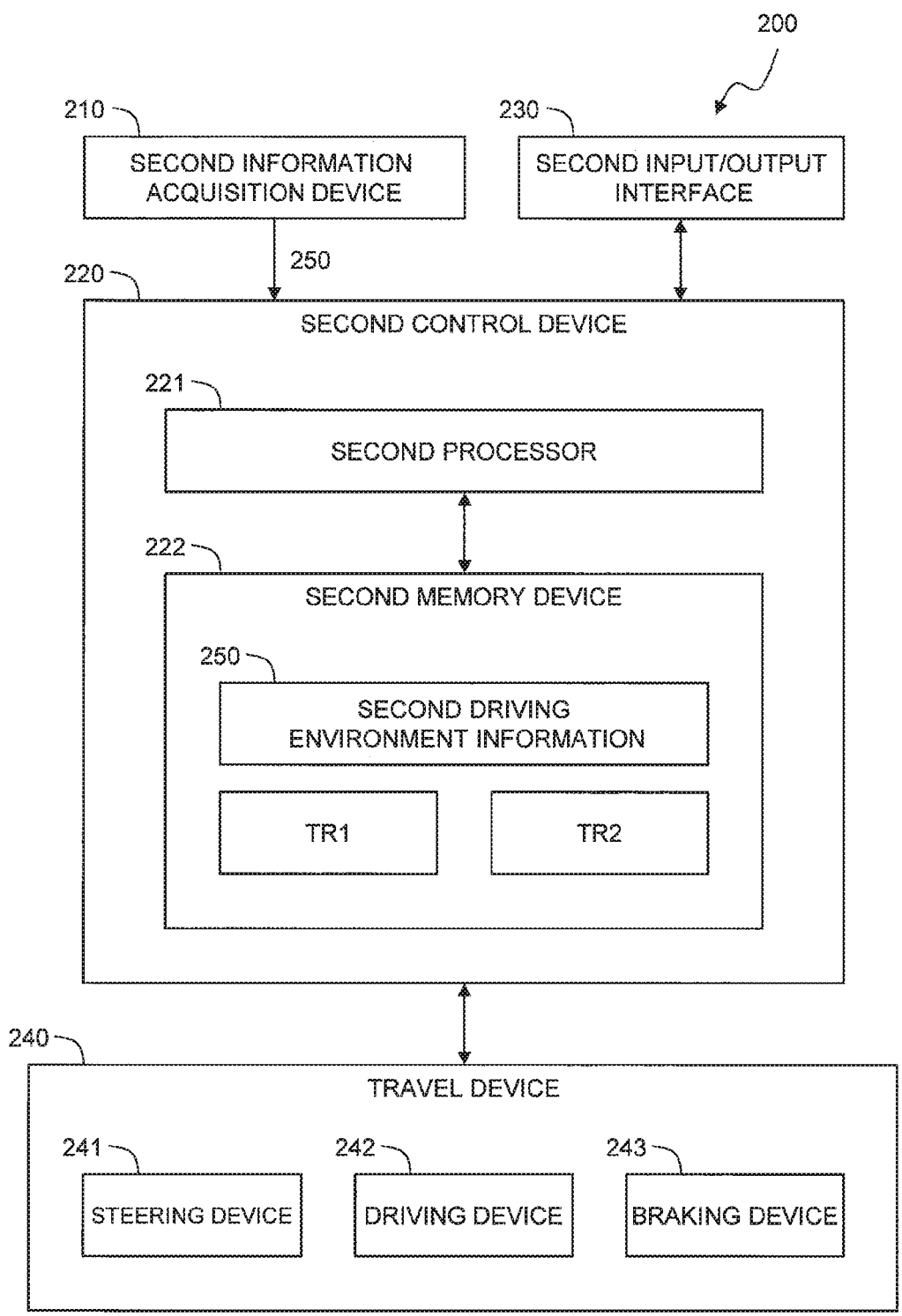
FIG. 11 is a block diagram showing a configuration example of a vehicle travel control device according to the embodiment.

FIG. 11 is a block diagram showing a configuration example of the vehicle travel control device 200 according to the embodiment. The vehicle travel control device 200 is provided with a second information acquisition device 210, a second control device 220, a second input/output interface 230, and a travel device 240.

The second information acquisition device 210 acquires second driving environment information 250. The second driving environment information 250 is information indicating a driving environment for the vehicle 1 and necessary for the vehicle travel control and the travel assist control.

Figure 12:
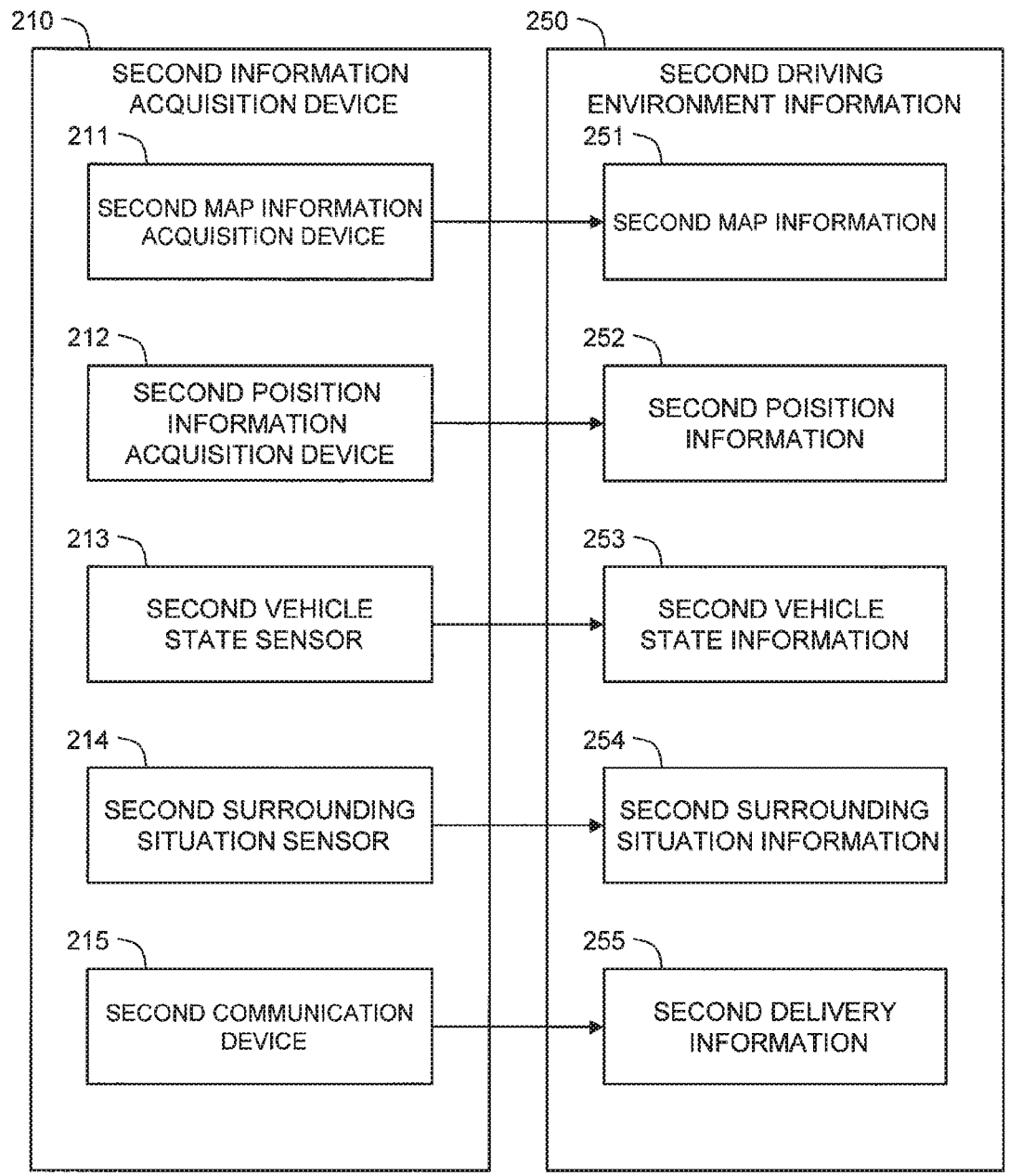
FIG. 12 is a block diagram showing an example of a second information acquisition device and second driving environment information in the vehicle travel control device according to the embodiment.

FIG. 12 is a block diagram showing an example of the second information acquisition device 210 and the second driving environment information 250. The second information acquisition device 210 includes a second map information acquisition device 211, a second position information acquisition device 212, a second vehicle state sensor 213, a second surrounding situation sensor 214, and a second communication device 215. The second driving environment information 250 includes second map information 251, second position information 252, second vehicle state information 253, second surrounding situation information 254, and second delivery information 255.

The second map information acquisition device 211 acquires the second map information 251. The second map information 251 indicates a lane configuration and a road shape. The second map information acquisition device 211 acquires the second map information 251 of a necessary area from a map database. The map database may be stored in a predetermined memory device mounted on the vehicle 1, or may be stored in a management server outside the vehicle 1. In the latter case, the second map information acquisition device 211 communicates with the management server to acquire the necessary second map information 251.

The second position information acquisition device 212 acquires the second position information 252 indicating a position and an orientation of the vehicle 1. For example, the second position information acquisition device 212 includes a GPS device for measuring the position and the orientation of the vehicle 1. The second position information acquisition device 212 may perform well-known localization to increase accuracy of the second position information 252.

The second vehicle state sensor 213 acquires the second vehicle state information 253 indicating a state of the vehicle 1. For example, the second vehicle state sensor 213 includes a vehicle speed sensor, a yaw rate sensor, an acceleration sensor, a steering angle sensor, and the like. The vehicle speed sensor detects a vehicle speed (i.e., a speed of the vehicle 1). The yaw rate sensor detects a yaw rate of the vehicle 1. The acceleration sensor detects an acceleration (e.g., a lateral acceleration, a longitudinal acceleration, a vertical acceleration) of the vehicle 1. The steering angle sensor detects a steering angle (a wheel turning angle) of the vehicle 1.

The second surrounding situation sensor 214 recognizes (detects) a situation around the vehicle 1. For example, the second surrounding situation sensor 214 includes at least one of a camera, a LIDAR and a radar. The second surrounding situation information 254 indicates a result of recognition by the second surrounding situation sensor 214. For example, the second surrounding situation information 254 includes information (target information) on a target recognized by the second surrounding situation sensor 214. The target is exemplified by a surrounding vehicle, a pedestrian, a roadside structure, an obstacle, a white line (lane marking), and the like. The target information includes information on a relative position and a relative velocity of the target with respect to the vehicle 1.

The second communication device 215 communicates with the outside of the vehicle 1. For example, the second communication device 215 communicates with an external device outside of the vehicle 1 via a communication network. The second communication device 215 may perform V2I communication with a surrounding infrastructure. The second communication device 215 may perform V2V communication with a surrounding vehicle. The second delivery information 255 is information acquired through the second communication device 215. For example, the second delivery information 255 includes information on the surrounding vehicle and road traffic information.

It should be noted that the first information acquisition device 110 and the second information acquisition device 210 may be partially identical. For example, the first map information acquisition device 111 and the second map information acquisition device 211 may be identical. The first position information acquisition device 112 and the second position information acquisition device 212 may be identical. The first vehicle state sensor 113 and the second vehicle state sensor 213 may be identical. That is to say, the automated driving control device 100 and the vehicle travel control device 200 may share a part of the second information acquisition device 210. In that case, the automated driving control device 100 and the vehicle travel control device 200 exchange necessary information with each other.

Referring again to FIG. 11, the configuration example of the vehicle travel control device 200 is described. The second input/output interface 230 is communicably connected with the automated driving control device 100.

The travel device 240 includes a steering device 241, a driving device 242, and a braking device 243. The steering device 241 turns (i.e., changes a direction of) a wheel of the vehicle 1. For example, the steering device 241 includes a power steering (EPS: Electric Power Steering) device. The driving device 242 is a power source that generates a driving force. The driving device 242 is exemplified by an engine, an electric motor, an in-wheel motor, and the like. The braking device 243 generates a braking force.

The second control device 220 (i.e., a second control device) is an information processing device for executing a variety of processing. For example, the second control device 220 is a microcomputer. The second control device 220 is also called an ECU. More specifically, the second control device 220 includes a second processor 221 and a second memory device 222.

A variety of information is stored in the second memory device 222. For example, the second driving environment information 250 acquired by the second information acquisition device 210 is stored in the second memory device 222. The second memory device 222 is exemplified by a volatile memory, a nonvolatile memory, a HDD, and the like.

The second processor 221 executes vehicle travel control software which is a computer program. The vehicle travel control software is stored in the second memory device 222 or recorded on a computer-readable recording medium. The functions of the second control device 220 are realized by the second processor 221 executing the vehicle travel control software.

3-2. Vehicle Travel Control

The second control device 220 executes the vehicle travel control by controlling an operation of the travel device 240. Specifically, the second control device 220 controls the steering, the acceleration, and the deceleration of the vehicle 1. The second control device 220 executes the vehicle travel control by controlling an operation of the travel device 240. More specifically, the second control device 220 controls the steering (turning of the wheel) of the vehicle 1 by controlling an operation of the steering device 241. The second control device 220 controls the acceleration of the vehicle 1 by controlling an operation of the driving device 242. The second control device 220 controls the deceleration of the vehicle 1 by controlling an operation of the braking device 243.

In particular, the second control device 220 executes the vehicle travel control such that the vehicle 1 follows the target trajectory TR. In this case, the second control device 220 calculates a deviation between the vehicle 1 and the target trajectory TR based on the target trajectory TR, the second position information 252, and the second vehicle state information 253. The deviation includes a lateral deviation (i.e., a Y-direction deviation), a yaw angle deviation (i.e., an azimuth angle deviation), and a velocity deviation. Then, the second control device 220 executes the vehicle travel control such that the deviation between the vehicle 1 and the target trajectory TR decreases.

The second control device 220 calculates a control amount for controlling the travel device 240, that is, a control amount of at least one of the steering, the acceleration, and the deceleration. The control amount required for the vehicle 1 to follow the target trajectory TR, that is, the control amount required for reducing the deviation between the vehicle 1 and the target trajectory TR is hereinafter referred to as a "required control amount CON." The required control amount CON includes a target steering angle, a target yaw rate, a target velocity, a target acceleration, a target deceleration, a target torque and a target current. The second control device 220 controls the operation of the travel device 240, that is, controls at least one of the steering, the acceleration, and the deceleration in accordance with the required control amount CON.

3-3. Travel Assist Control

The second control device 220 also executes the travel assist control. As the travel assist control, the collision avoidance control and the lane departure suppressing control are exemplified. The collision avoidance control assists to avoid a collision between the vehicle 1 and a surrounding object (i.e., the avoidance target). The lane departure suppressing control suppresses a departure of the vehicle 1 from the driving lane. Hereinafter, processing related to the travel assist control will be described.

3-4. Processing Related to Travel Assist Control

Figure 13:
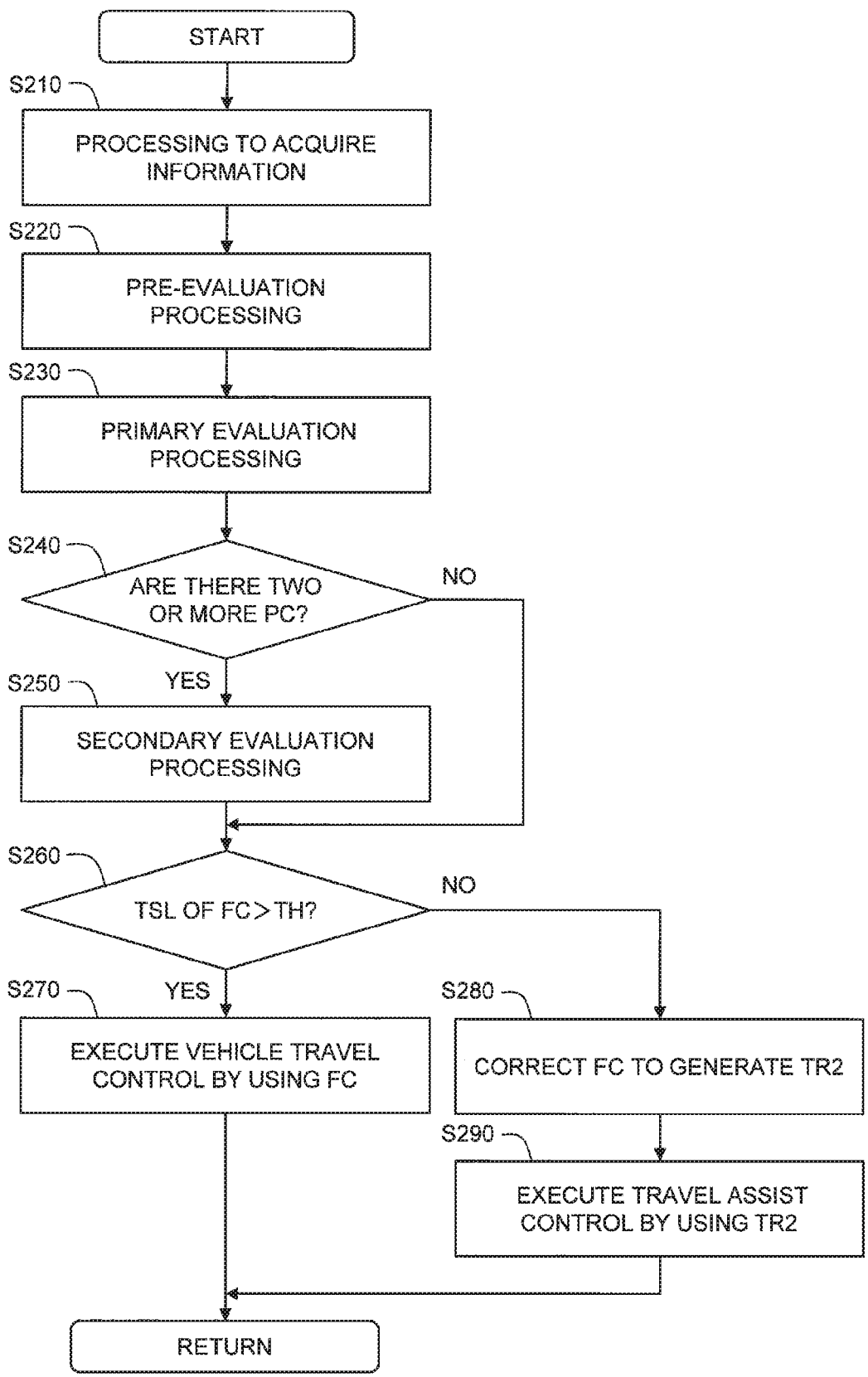
FIG. 13 is a flowchart showing an example of processing related to the travel assist control executed by the vehicle travel control device according to the embodiment.

FIG. 13 is a flow chart showing an example of processing related to the travel assist control by the second control device 220 (the second processor 221). The processing flow shown in FIG. 13 is repeatedly executed at a regular interval. Here, the automated driving of the vehicle 1 is in execution.

At first, the second control device 220 acquires the second driving environment information 250 from the second information acquisition device 210 (step S210). The second driving environment information 250 is stored in the second memory device 222. Moreover, the second control device 220 receives information indicating the first target trajectory TR1 from the automated driving control device 100 via the second input/output interface 230. The information indicating the first target trajectory TR1 is stored in the second memory device 222.

Subsequent to the step S210, the second control device 220 executes a pre-evaluation processing (step S220). In the pre-evaluation processing, the first target trajectory TR1 (i.e., the primary candidate PC) that was generated outside a range where the vehicle travel control device 200 guarantees the driving safety of the vehicle 1 is excluded from the first target trajectory TR1 stored in the second memory device 222.

Figure 14:
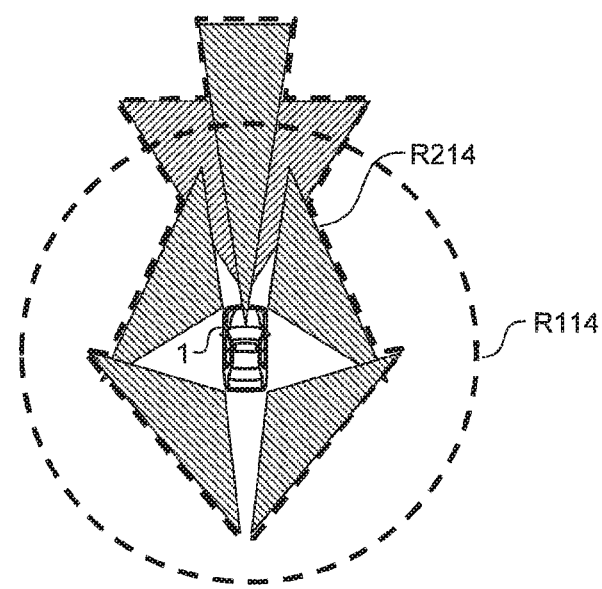
FIG. 14 is a conceptual diagram for explaining an example of ranges in which the vehicle travel control device guarantees the driving safety of the vehicle.

FIG. 14 is a conceptual diagram for explaining an example of ranges in which the vehicle travel control device 200 guarantees the driving safety of the vehicle 1. In the examples shown in FIG. 14, a total of six the second surrounding situation sensors 214 are mounted on the vehicle 1. Each of the triangular regions schematically indicates the range where the respective second surrounding situation sensors 214 can detect. The extent to which the vehicle travel control device 200 ensures the driving safety of the vehicle 1 is a region R214 covered by these triangular regions. The range where the vehicle travel control device 200 guarantees the driving safety of the vehicle 1 may be set inside the region R214.

The first target trajectory TR1 is generated inside a region R114. The region R114 is a region where the first surrounding situation sensor 114 can detect. When the information indicating the first target trajectory TR1 is included outside the region R214, it is difficult for the vehicle travel control device 200 to guarantee the driving safety of the vehicle 1. Therefore, when the information indicating the first target trajectory TR1 (i.e., the primary candidate PC) is included outside the region R214, the second control device 220 deletes it. A portion of the information of the first target trajectory TR1 outside the region R214 may be deleted, while leaving that located inside the region R214.

Subsequent to the step S220, the second control device 220 executes the primary evaluation processing (step S230). In the primary evaluation processing, the one having the highest travel safety level TSL is selected from the primary candidates PC. If only one of the primary candidate PC is stored in the second memory device 222, the stored primary candidate PC is determined as the finalist candidate FC. Or, if the primary candidate PC is narrowed down to one as the result of the pre-evaluation processing, the refined primary candidate PC is determined to be the finalist candidate FC.

Subsequent to the step S230, the second control device 220 judges whether or not there are two or more of the primary candidates PC with the highest travel safety level TSL (step S240). If the judgement result of the step S240 is positive, the second control device 220 executes the secondary evaluation processing (step S250). In the secondary evaluation processing, one finalist candidate FC is determined from the two or more primary candidates PC (i.e., the strong candidates SC). The secondary evaluation processing will be described in detail later.

Subsequent to the step S250, the second control device 220 determines whether or not the travel safety level TSL of the travel to follow the finalist candidate FC is less than or equal to the threshold TH (step S260). If the judgement result of the step S240 is negative, the second control device 220 also executes the processing of the step S260.

Consider the collision avoidance control as an example of the travel assist control. The second control device 220 recognizes the avoidance target (e.g., a surrounding vehicle or a walker) in front of the vehicle 1 based on the second surrounding situation information 254 (i.e., object information). In addition, the second control device 220 judges whether or not the travel safety level TSL of the travel to follow the finalist candidate FC is equal to or less than the threshold TH. For example, the travel safety level TSL is set to a higher level as the distance DY (i.e., the distance in the Y direction between avoidance target and vehicle 1 when the X positions of avoidance target and vehicle 1 coincide) becomes longer. Alternatively, the travel safety level TSL may be set to the higher level as the Time to collision TTC increases.

As another example of the travel assist control, the lane departure suppressing control will be considered. For example, when the vehicle 1 fluctuates in the travel lane and approaches a compartment line of the travel lane, the lane departure suppression control steers the vehicle 1 back to the central of the travel lane. For this purpose, the second control device 220 recognizes, on the basis of the second surrounding situation information 254, recognizes the compartment line of the lane along which the vehicle 1 travels and monitors a distance DL between the final candidate FC and the compartment line. Then, second control device 220 determines whether or not the travel safety level TSL of the travel to follow the finalist candidate FC is equal to or less than the threshold TH. The travel safety level TSL is set to the higher level as the distance DL becomes longer.

If the judgement result of the step S260 is positive, the second control device 220 executes the vehicle travel control by using the finalist candidate FC (step S270). The second control device 220 calculates control amount (i.e., the required control amount CON) required to reduce a deviation between the vehicle 1 and the first target trajectory TR1. The second control device 220 then controls an operation of the driving device 242 in accordance with the required control amount CON. That is, the second control device 220 controls at least one of the steering, the acceleration and the deceleration.

On the other hand, if the judgement result of step S260 is negative, the second control device 220 modifies the finalist candidate FC to generate the second target trajectory TR2 (step S280). An example to modify the finalist candidate FC will be described later. The second control device 220 stores in the second memory device 222 the information indicating the second target trajectory TR2.

Consider the collision avoidance control as an example of the travel assist control. If the travel safety level TSL of the travel to follow the finalist candidate FC is less than or equal to the threshold TH, the finalist candidate FC is modified based on the index used to judge the travel safety level TSL. If the judgement index is the distance DY, the target position [Xi, Yi] of the finalist candidate FC is modified such that the travel safety level TSL for the distance DY is higher than the threshold TH. If the judgement index is the Time to collision TTC, the target speed [VXi, VXi] of the finalist candidate FC is modified such that the travel safety level TSL for the Time to collision TTC is higher than the threshold TH.

As another example of the travel assist control, the lane departure suppressing control will be considered. If the travel safety level TSL of the travel to follow the finalist candidate FC is less than or equal to the threshold TH, the finalist candidate FC is modified based on the distances DL. Specifically, the target position [Xi, Yi] of the finalist candidate FC is modified such that the travel safety level TSL for the distances DL is higher than the threshold TH.

Subsequent to the step S280, the second control device 220 executes the travel assist control by using the second target trajectory TR2 (step S290). The second control device 220 calculates the control amount (i.e., the required control amount CON) required to reduce the deviation between the vehicle 1 and the second target trajectory TR2. The second control device 220 then controls an operation of the driving device 242 in accordance with the required control amount CON. That is, the second control device 220 controls at least one of the steering, the acceleration and the deceleration.

3-5. Detail of Secondary Evaluation Processing

The secondary evaluation processing is executed by using the additional evaluation index. The additional evaluation index is switched in accordance with a magnitude relation between the travel safety level TSL of the travel to follow the strong candidate SC and the threshold TH. First, a case where the travel safety level TSL of the travel to follow the strong candidate SC is higher than the threshold TH will be described. The additional evaluation index in this case is at least one of the driving efficiency, the deviation level from the limiting speed, and the degree of change from the current vehicle state.

Figure 15:
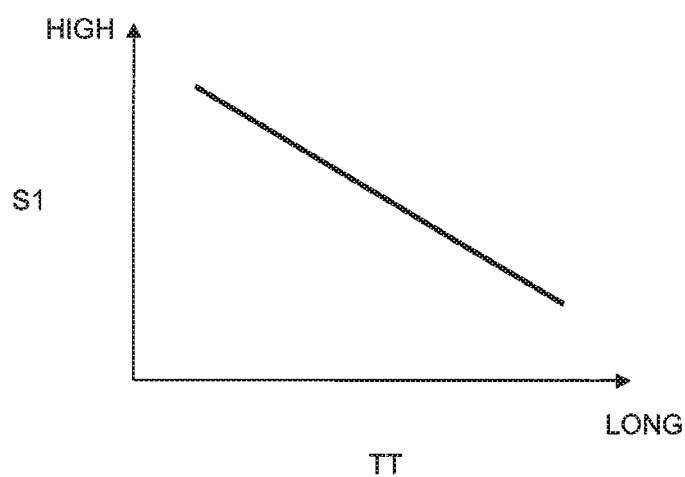
FIG. 15 is a diagram for explaining an additional evaluation index (driving efficiency)

The driving efficiency is represented by, for example, a length of a turnaround time TT from current position to a destination when the vehicle is driven based on the strong candidate SC. The driving efficiency is hereinafter referred to as a "first score S1". FIG. 15 is a diagram for explaining an exemplary relationship between the turnaround time TT and the first score S1. As shown in FIG. 15, the shorter the turnaround time TT, the higher the first score S1. Therefore, the first score S1 of the strong candidate SC that does not require the vehicle 1 to decelerate is high whereas that of the strong candidate SC requiring the vehicle 1 to decelerate is low.

Figure 16:
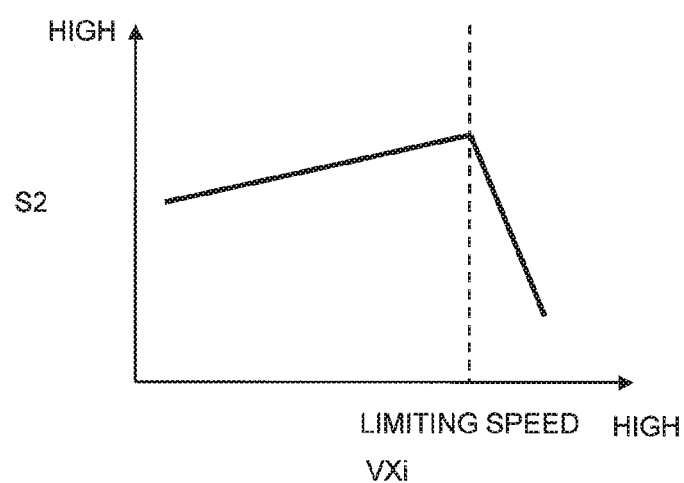
FIG. 16 is a diagram for explaining the additional evaluation index (a deviation level from limiting speed)

The deviation level is represented by, for example, the deviation between the target speed [VXi] and limiting speed when the vehicle travels based on the strong candidate SC. The deviation level is hereinafter referred to as a "second score S2". The limiting speed is an upper limit speed of a vehicle defined by traffic rules and is included in the second surrounding situation information 254 or the second delivery information 255. FIG. 16 is a diagram for explaining an exemplary relationship between the target speed [VXi] and the second score S2. As shown in FIG. 16, in a lower speed region than the limiting speed, the second score S2 gradually increases as the target speed [VXi] increases. In a higher speed region than the limiting speed, the second score S2 drops sharply as the target speed [VXi] increases. Therefore, the second score S2 of the strong candidate SC having the target speed [VXi] close to the limiting speed is high. The second score S2 of the strong candidate SC having the target speed [VXi] that deviates significantly from the limiting speed is low.

Figure 17:
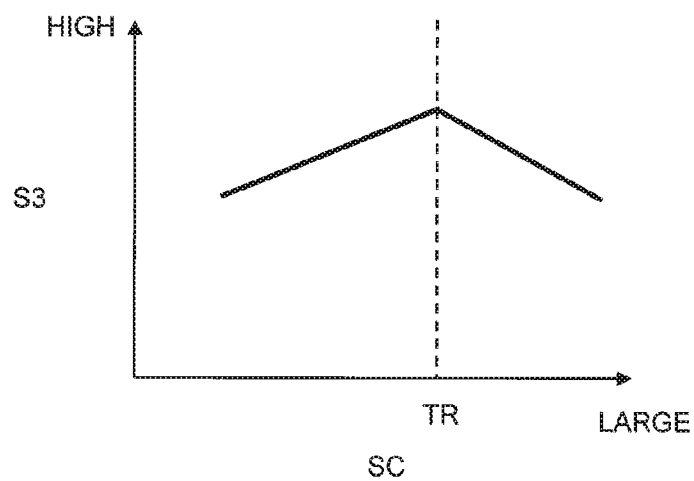
FIG. 17 is a diagram for explaining the additional evaluation index (a degree of change from current vehicle state)

The degree of change is represented, for example, by the deviation between the strong candidate SC when the travel to follow the strong candidate SC is performed and current target trajectory TR. The degree of change is hereinafter referred to as a "third score S3". The current target trajectory TR is the target trajectory TR to which the vehicle 1 currently follow and is stored in the second memory device 222. FIG. 17 is a diagram for explaining an exemplary relationship between the strong candidate SC and the third score S3. As shown in FIG. 17, the closer strong candidate SC is to the current target trajectory TR, the higher the third score S3. Therefore, the third score S3 of the strong candidate SC having information close to the information indicating the current target trajectory TR becomes high.

The first score S1, the second score S2 and the third score S3 may be a combination of two or more of these scores. In this case, the scores to be combined are replaced with a common score. The secondary evaluation is then executed by summing the common score.

Next, a case where the travel safety level TSL of the travel to follow the strong candidate SC is less than or equal to the threshold TH will be described. The additional evaluation index in this instance is a vehicle safety level VSL at an impact. While the travel safety level TSL is calculated by the risk to collide with the avoidance target, the vehicle safety level VSL is set on a premise of a collision with the avoidance target. Examples of the vehicle safety level VSL include type of the driving device 242 controlled in the travel assist control and crash location of the vehicle 1.

Typically, if only the braking device 243 is controlled, it is more likely that an energy experienced by the vehicle 1 at the collision with the avoidance target can be reduced than if only the steering device 241 is controlled. Therefore, the vehicle safety level VSL of the strong candidate SC requiring the vehicle 1 to decelerate is high, and that of the strong candidate SC not requiring the vehicle 1 to decelerate is low.

Figure 18:
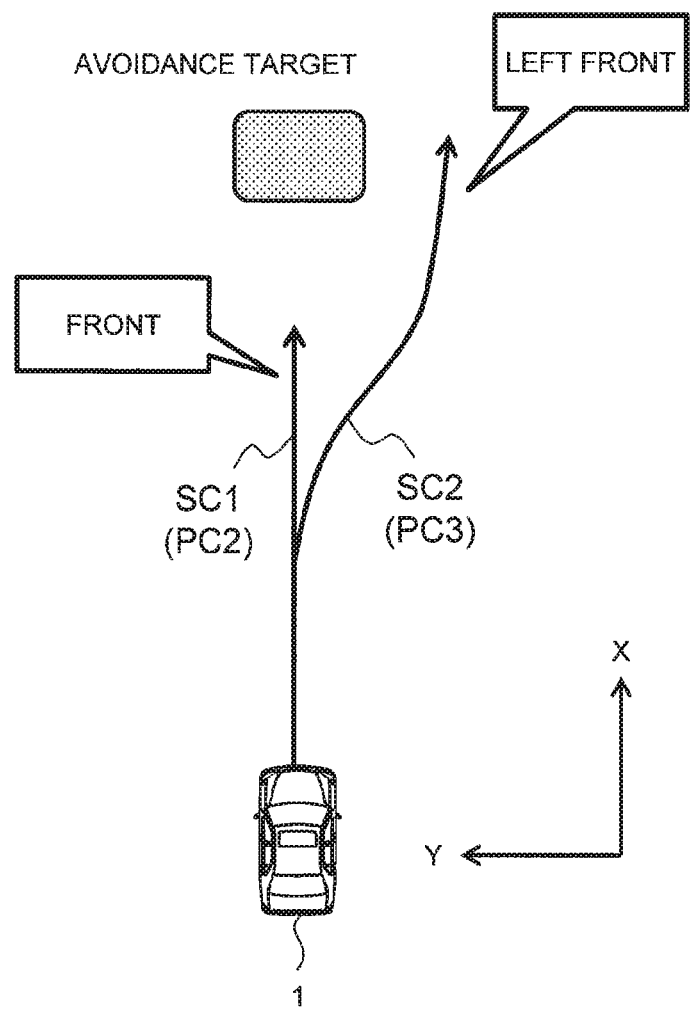
FIG. 18 is a conceptual diagram illustrating an example of a crash location of a vehicle.

FIG. 18 is a conceptual diagram illustrating an example of a crash location of the vehicle 1. In the example shown in FIG. 18, the primary candidates PC2 and PC3 shown in FIG. 5 remain as the strong candidates SC1 and SC2. When the vehicle travels to follow the strong candidate SC1, the crash location will be a front portion of the vehicle 1. When the vehicle travels to follow the strong candidate SC2, the crash location will be a left front portion of the vehicle 1. Therefore, according to the travel to follow the strong candidate SC2, there is a higher possibility that damages at the crash are suppressed than that to follow the strong candidate SC1. Thus, the vehicle safety level VSL of the strong candidate SC2 is high and that of the strong candidate SC1 is low.

4. Modified Example

Figure 19:
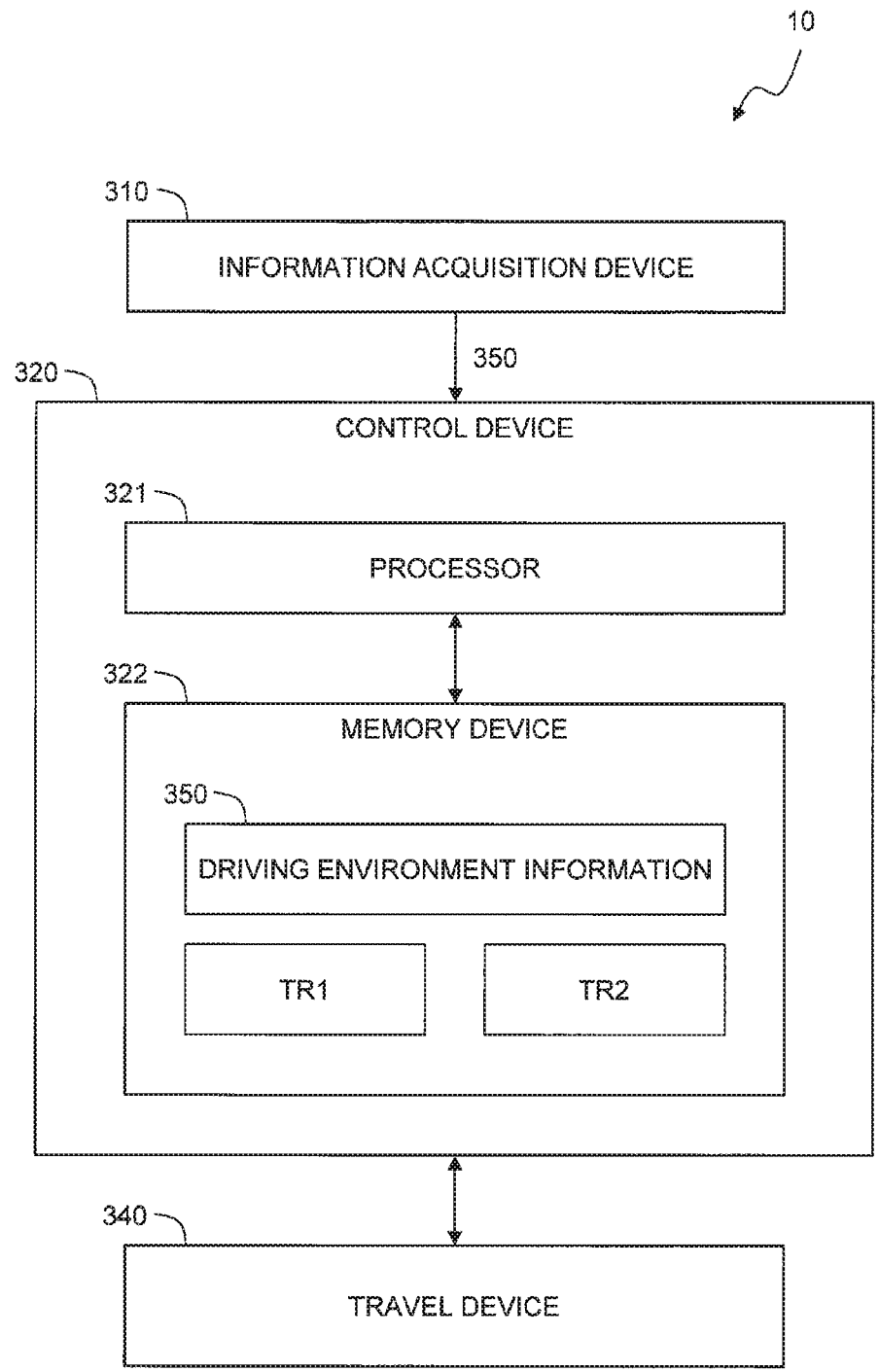
FIG. 19 is a block diagram showing configuration example of the vehicle control system according to a modified example of the embodiment.

In the embodiment described above, it is assumed that the vehicle control system 10 comprises the automated driving control device 100 and the vehicle travel control device 200. However, the automated driving control device 100 and the vehicle travel control device 200 may be comprised of a single control device. FIG. 19 is a block diagram showing a configuration of the vehicle control system 10 according to a modified example of the embodiment. The vehicle control system 10 comprises an information acquisition device 310, a control device 320 and a driving device 340.

The information acquisition device 310 obtains the driving environment information 350. The information acquisition device 310 is identical to the first information acquisition device 110 or the second information acquisition device 210. The driving environment information 350 is identical to the first driving environment information 150 or the second driving environment information 250. The driving device 340 is identical to the driving device 242.

The control device 320 includes a processor 321 and a memory device 322. Various information is stored in the memory device 322. For example, the memory device 322 stores the driving environment information 350 acquired by the information acquisition device 310. The processor 321 executes control programs. The control programs are stored in the memory device 322 or recorded in a computer-readable recording medium. The processor 321 executes the control programs to realize various processing executed by the control device 320.

The control device 320 has a function as the first control device 120 of the automated driving control device 100 and a function as the second control device 220 of the vehicle travel control device 200. That is, in the examples shown in FIG. 19, the information acquisition device 310 and the control device 320 correspond to the automated driving control device 100, and the information acquisition device 310, control device 320 and the driving device 340 correspond to the vehicle travel control device 200.

Generally speaking, the vehicle control system according to the embodiment includes one processor (i.e., the processor 321) or more processors (i.e., the first processor 121 and the second processor 221). The one or more processors executes operations as the automated driving control device 100 and the vehicle travel control device 200 based on the driving environment information stored in one or more memory devices.

What is claimed is:

1. A vehicle control system in which automated driving of a vehicle is performed, the vehicle control system comprising:
   a first processor and a first memory device that stores a program executable by the first processor, and
   a second processor and a second memory device that stores a program executable by the second processor,
   wherein the first processor is configured to manage the automated driving of the vehicle and the second processor is configured to assist control of travel of the vehicle,
   wherein when the first program is executed by the first processor, the first processor is configured to:
   acquire a configuration shape of a travel lane ahead of the vehicle;
   acquire first driving environment information from a first information acquisition device;
   recognize an avoidance target ahead of the vehicle;
   predict future positions of the vehicle and the avoidance target;
   calculate a possibility that the vehicle collides with the avoidance target; and
   if the possibility that the vehicle collides with the avoidance target is greater than or equal to a threshold, generate a first target trajectory for avoiding the collision based on vehicle state information associated with the vehicle and surrounding situation information associated with the avoidance target;
   generate at least one primary candidate associated with the first target trajectory for the automated driving while maintaining the travel lane, based on the acquired shape of the travel lane;
   when the vehicle travels at a constant speed and no avoidance target is recognized ahead of the vehicle, the at least one primary candidate comprises one primary candidate;
   when the avoidance target is recognized ahead of the vehicle, the at least one primary candidate comprises a first primary candidate comprising a change in trajectory of the vehicle, a second primary candidate comprising a change in speed of the vehicle, and a third primary candidate comprising the change in trajectory of the vehicle and the change in speed of the vehicle; and
   transmit the at least one primary candidate to the second processor,
   wherein when the second program is executed by the second processor, the second processor is configured to:
   acquire a lane configuration and a road shape from a map database;
   acquire vehicle state information comprising a speed of the vehicle, a yaw rate of the vehicle, an acceleration of the vehicle, and a steering angle of the vehicle;
   acquire information on an avoidance target in front of the vehicle;
   execute primary evaluation in which travel safety level of a travel subsequent to the at least one primary candidate is used as an evaluation index, and select, as a strong candidate, the at least one primary candidate having highest travel safety level from the at least one primary candidate based on the vehicle state information and the information on the avoidance target;
   determine whether there are two or more strong candidates;
   upon determination that there are not two or more strong candidates, determine the selected strong candidate as a finalist candidate of the target trajectory; and
   upon determination that there are two or more strong candidates:
   judge whether or not travel safety levels of the selected strong candidates are larger than a threshold;
   if it is determined that the travel safety levels of the selected strong candidates are larger than the threshold, set, as the additional evaluation index, a turnaround time from a current position of the vehicle to a destination;
   if it is determined that the travel safety levels of the selected strong candidates are less than or equal to the threshold, set a vehicle safety level at an impact as the additional evaluation index; and
   execute a secondary evaluation for the selected strong candidates based on the additional evaluation index to determine the finalist candidate.

2. The vehicle control system according to claim 1, wherein when the second program is executed by the second processor, the second processor is further configured to:
   judge whether or not the travel safety level of the finalist candidate is higher than the threshold; and
   if it is determined that the travel safety level of the finalist candidate is less than or equal to the threshold, modify the finalist candidate such that the travel safety level of the finalist candidate larger than the threshold.

3. The vehicle control system according to claim 1, wherein the first processor is further configured to generate the first target trajectory inside a region where driving safety of the vehicle is guaranteed.

* * * * *